July 5, 1966    D. C. WHITTLEY ET AL    3,259,340
INTERMEDIATE LIFT SYSTEM FOR JET AIRCRAFT AND METHOD
Filed Aug. 29, 1963
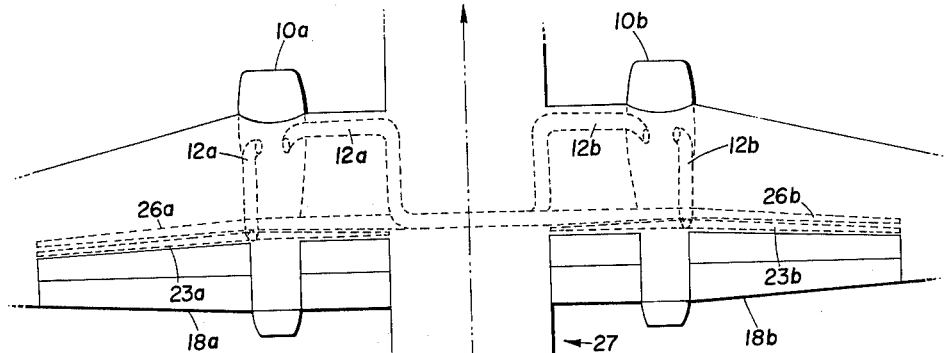
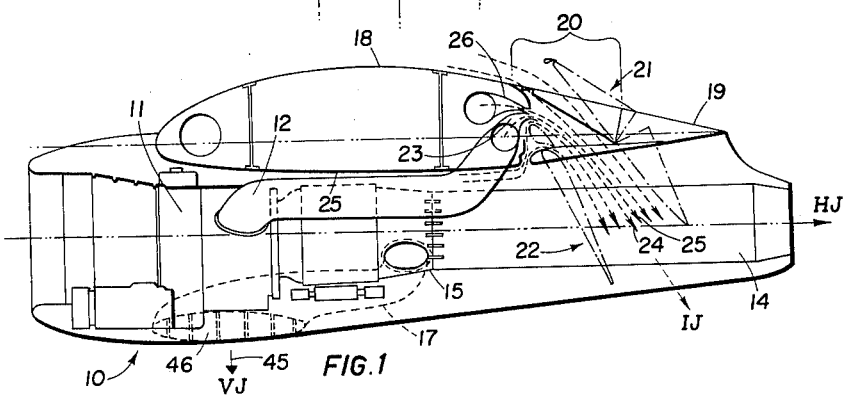
Inventors
DONALD CHARLES WHITTLEY
IAN AUBREY KING
by: *Cavanagh & Norman*

United States Patent Office 3,259,340
Patented July 5, 1966

3,259,340
INTERMEDIATE LIFT SYSTEM FOR JET AIRCRAFT AND METHOD
Donald Charles Whittley, Islington, Ontario, and Ian Aubrey King, Toronto, Ontario, Canada, assignors to The De Havilland Aircraft of Canada, Limited, Downsview, Ontario, Canada
Filed Aug. 29, 1963, Ser. No. 305,264
5 Claims. (Cl. 244—42)

This invention relates to the method of creating lift supplementary to normal airfoil lift.

The aircraft herein disclosed may for convenience be classified as a VISTOL type and is adapted at cruising and higher speeds to operate according to performance characteristics of conventional jet aircraft wherein the jet power plant generates thrust in the main horizontal propulsive jet stream emerging directly from the power plant, and the wing structure in its contours provides for lift.

Prior attempts to provide a jet aircraft driven at cruising and higher speeds in whole or in part by jet streams emitted from the trailing edge of the wing structure should not be aerodynamically or operationally confused with the present invention because the present invention provides for conventional aerodynamic structure and function in this portion of flight.

The aircraft of the invention includes in its power plant provision for substantial by-pass air which in normal cruising and high-speed flight is entirely fed into the main propulsive jet stream but which, during operations of take-off or in the later stages of landing procedures is diverted and utilized entirely within the wing structure to capture upper and lower surface air from the surface of the wing in such manner as to accelerate and increase the flow of air over such surfaces, and to direct such substantial additional volumes of air downwardly through the wing by shroud structure defined by flap means forming a diffuser which is controllable to provide a lifting thrust, the pitching moment of which is substantially balanced by a nose-up moment on the airfoil section derived from a greater increased flow of air over the upper surface than over the lower surface.

While downward thrust fan systems have been provided heretofore in combination with wing structures to effect a vertical lift component even to the extent of direct vertical take-off, such prior systems are not directly compatible with those conditions encountered in the final stages of an approach for landing such as required to be made by a short landing type of aircraft of relatively large aspect ratio in the wing structure. What is required and that which is provided by this invention is the controllable capturing and directing of large quantities of upper and lower surface air about the wing into a downwardly and rearwardly controllable jet thrust stream thus to provide a vertical thrust component which increases as the main power plant horizontal thrust component is decreased, by the removal of by-pass air therefrom other conditions being constant, thus enabling a smooth change in lift-thrust conditions of the aircraft for take off and landing at low speeds.

The invention also contemplates the utilization of one or more jet power plants such as two mounted on the wing on opposite sides of the fore and aft plane of symmetry and at equal distance from the plane respectively but having by-pass air generated by each power plant and controllably communicable from each power plant to the main jet stream thereof or alternatively to the internal jet streams in the structure of said wings equally on both sides of the aircraft, whereby a failure of one of the said power plants at any point of control will effect the jet streams on both sides of the aircraft identically and automatically without calling for any special emergency measure by the operator.

It is to be recorded that upper and lower surface air has been used heretofore for changing aerodynamic characteristics. For example, Steinmetz, employed an external lower surface venturi for drawing on upper surface air to control aerodynamic characteristics. Also, Henri Coanda is a recognized authority in the provision of so-called Coanda slits in external wing trailing edges for providing a driving thrust by utilizing an external entrainment phenomenon of air caused to pass over a curved surface sometimes described as a Coanda effect and which gives rise to controllable aerodynamic characteristics. Such, however, are directed to external generation of thrust for free flight purposes, that is, at cruising and higher speeds and are intended to replace, in the main, the thrust effect of the main jet stream of the power plant during high-speed flight. In addition, Robert Pouit is proponent of high-speed flight utilizing upper surface air in combination with external Coanda slits over a flap structure whereby the flap structure may also be employed to provide a downward thrust component while changing the aerodynamic characteristics by evacuating the leading edge of the wing to maintain stability presumably during the final stages of landing procedures at which point stability is most difficult. Furthermore, Arthur D. Wood has proposed the utilization of upper and lower surface boundary air with an external Coanda slit in such manner as to divert the same but by exterior surface entrainment only, thus to provide a re-direction of such external air by virtue of the Coanda effect in the form of a re-directed motion of the air stream rather than a jet stream of any kind.

According to this invention a different kind of so-called Coanda slit is provided internally in a wing structure in a gap between a rigid wing portion and a flap defining the trailing edge of the wing section in such manner that the slit formation directs high pressure air through an arc by way of a slit type nozzle to substantially the middle of said gap in a direction pointing downwardly. A lower door and an upper door for said gap are moveable with or substantially with said flap being to some degree independent thereof to define therewith a diffuser shroud about said slid nozzle for the length thereof whereby large quantities of air from the wing upper surface are drawn through said diffuser and a lesser quantity of air is drawn over the leading edge of the lower door into said diffuser thus greatly to augment the thrust which would be available from the jet stream from the internal Coanda slit alone.

In the past the use of high lift co-efficients derived from fans in the wing or downwardly directed jet streams resulted in a far aft position of the centre of pressure thus introducing a serious control problem. While, according to the thrust augmenting systems of this invention the centre of pressure might likewise be expected to be moved rearwardly of the desired location for the centre of pressure; the invention compensates for this condition by providing for a greater opening for inducted air from the upper surface by way of the upper door than from the lower surface by way of the lower door. Thus the invention draws additional air over the wing surface by different induction of large quantities of upper and lower surface air through said gap to generate a nose-up moment. This results in a shifting forward of the centre of pressure position as the speed of surface airflow increases thus assisting trimming at dynamic pressures as low as two pounds per square foot, representing a low forward speed of the order of about 25 miles per hour. The additional lift factor becomes significant as a lift factor at about 50 miles per hour and rapidly increases above that speed. Above about 50 miles per hour the centre of pressure remains constant in its location until in free flight at cruising and higher speeds with all flaps closed, it is contained in the position determined by the usual aerodynamic characteristics of the airfoil design contours.

Having regard to the foregoing it is another object of this invention to provide a novel internal Coanda slit wing structure adapted to entrain upper and lower surface air from the wing surfaces wherein a scoop flap of the invention is employed for scooping large quantities of air from the upper surface of the wing for downward entrainment by internal Coanda slits in the wing.

Other objects of the invention will be appreciated by a study of the following specification taken in conjunction with the accompanying drawings:

FIGURE 1 is a longitudinal section of a wing and jet power plant structure according to the invention.

FIGURE 2 is a planned view of a two engine power plant incorporating plan view of a portion of a two engine aircraft structure embodying the invention.

FIGURES 3 to 5 are diagrammatic illustrations of wing structure illustrating three different kinds of flight capability according to the invention.

FIGURES 6 to 8 are motion direction capability diagrams for the different kinds of flight illustrated in FIGURES 3 to 5 respectively.

FIGURES 9 to 11 disclose the valved or controlled distribution of by-pass jet power plant air and hot gases to the horizontal main jet, the wing intermediate jet system herein, and the axillary vertical jet, to accomplish these three classes of flight corresponding respectively in FIGURES 3 to 5 and 6 to 8.

Referring to FIGURE 1 it will be apparent that the invention preferably makes use of a lift-thrust turbo fan class of engine 10 characterized by an excess by-pass or axillary air take-off from manifold 11(A) having cold air outlets 12 and including valving indicated at 13(V) in FIGURES 9 to 11 for controllably directing such by-pass air through the engine and the main jet tube 14 or through the outlets 12. In addition, such class of engine provides for a hot gas manifold 15(G) adjacent to jet tube 14 and including valving 16(V) of FIGURES 9 to 11 for controllably directing hot gases into the main jet tube 14 and or a vertical take-off valve 16 and blast tube 17 for such gases in FIGURES 9 to 11. The source of by-pass air and the source of hot gases are designated by the manifold numbers 11 and 15 respectively. Such a class of jet power plant is available such as from Bristol Aero-Engines Limited and has been employed heretofore for vertical thrust applications and for wing trailing edge external jet axillary thrust systems.

According to this invention, however, the wing structure provides for a rigid forward structure 18 separated from a trailing edge flap 19 by a gap 20 which extends completely through the wing structure and which is adapted to be closed in free normal flight, that is, under high speed conditions, by upper and lower door structures 21 and 22 respectively.

Entirely within the wing structure and within said gap 20 there is provided at least one Coanda slit type nozzle 23 arcuately converying to define a spanwise slit adapted to direct air emitted therefrom in a downward path 24 within said gap and below the lower wing surface 25. In multiple engined aircraft a second Coanda slit type nozzle 26 is supported in parallel relation with said nozzle structure 23 to emit air therefrom in a path 25 very close to and or with the emission path 24. The port engine 10a by its communicating ducts 12a and 12a communicates to internal nozzle structure 23a of port wing structure 18a and respectively to spanwise slit nozzle structure 26b of starboard wing structure 18b. Likewise, ducts 12b and 12b of starboard engine 10b communicate to respective starboard and port slit nozzles 23b and 26a of the wing structure of two engine aircraft 27.

Accordingly, failure of one engine will disable only a single slit jet nozzle in each wing simultaneously leaving a remaining slit jet nozzle structure in each, fully operated by the remaining operating engine, thus to retain full control without any action of the operator or the functioning of protective devices.

The internal spanwise jet devices 23 and 26 are utilized for an intermediate or second class flight condition to provide an additional thrust and lift.

In FIGURES 3, 6 and 9 a normal high speed free flight condition is illustrated wherein resultant lift 28 is developed from the normal aerodynamic characteristics of the wing contour 29 and is correctly located relative to the desired location of the centre of pressure. The free flight motion capability as to direction, that is, angle of attack, represented by maximum climbing and descending angles of attack, is represented in FIGURE 6, arrows 30 and 31 representing the maximum angles of attack from the horizontal to maintain the desired flow of air over the wing contour to preserve lift. The control diagram of FIGURE 9 reveals the utilization of the excess fan air 11 through valve 13 and of the hot gases from the manifold 15 through valve 16 all to the main or horizontal jet thrust tube 14.

In all respects the flight condition and class of flight represented in FIGURE 3 is conventional and, therefore, no special limitations need be imposed on the design of wing contour or aircraft for such flight condition other than those normally required for the class of aircraft to be designed and its required performance characteristics. While in this specification there is a preferred interest in the application of this invention to a STOL class of aircraft, it will be observed that there is no limitation in the high speed flight condition and thus no limitation in the class or type of aircraft in this class or phase of flight which may embody this invention having regards to this phase of flight.

FIGURES 4, 7 and 10 illustrate a condition utilizing the invention wherein FIGURE 7 reveals a range in angles of attack between substantially those for normal flight conditions of normal wing contour of FIGURE 3 substantially to the vertical direction but having definite forward motion as represented by upper and lower groups of arrows 32 and 33 respectively. The invention accomplishes this class of flight motion by generating additional lift from two sources. The one is an increased lift derived from the effect of wing contour due to increased air flow over the wing contour in addition to that available from the effect of forward speed alone. The other is a downward jet thrust from a gap 20 between the fixed forward wing structure and a trailing edge flap so arranged that a jet stream within the wing is augmented by upper and lower wing surface air in a shroud passage defined by the upper and lower doors swung away to open the gap and diffusing the air downwardly in a directable manner thus to effect the re-direction of upper and lower wing surface air to cause the induction of increased quantities of such air through said diffuser. The increased flow of air over the wing surface tends to increase its normal lift and to give rise to a nose-up lifting or moment counter-balancing the pitching moment which would otherwise derive from a rearward eccentricity of the downwardly thrusting jet force of the diffuser from the normal centre of pressure of the wing contour.

More specifically wing contour 18 of FIGURE 4 having upper and lower surfaces 29 and 25 has generated within the wing structure, a jet stream 34 of air from a spanwise Coanda slit as described in FIGURE 1 obtaining air from source 11 and directed by valve 13 through conduits 12 and slit jets 23, 26 through conduit 12 to form what may be described herein as an intermediate jet. Said jet stream 34 is shrouded by an upper door 21 which is swung upwardly, i.e., clockwise in the diagram to provide an intake opening 35 of large area as compared with a lower surface intake opening 36 provided by downward pivoting of lower door 22 describing thus in its substantially parallel spaced relation to door 21 and rear flap 19 a shroud and diffuser structure 37. The upper surface opening 35 is preferably characterized by an upwardly and forwardly projection lip portion 38 describing a projecting scoop portion of said door whereby large quantities of air may be scooped and inducted into gap 20. It is contemplated however, that an upward projection of such upper door shall be required mainly for wing structure of large aspect ratio and that said door 21 in many applications need only provide for a relatively large opening 35 in forming a downward intermediate jet thrust as described herein, it being understood that the same may form part of the rear flap structure 19 as may be required.

In FIGURE 4, however, the door 21 and rear flap 19 may be considered as separately movable and or controllable together in such manner as to provide for the indraft of required quantities of upper and lower surface air from the wing contour and effectively to diffuse the resulting downward so-called intermediate thrust at 39 in the downward direction desired. The increased flow of air over the wing surface over that due to forward motion alone maintains some degree of normal lift 28 and creates a nose-up lift 40 which counters the displacement from the normal location of centre of pressure on the line of normal lift 28 of the upward lift 41 obtained from intermediate thrust 39. As revealed in FIGURE 10 main jet designated HJ and located by numeral 14 in FIGURE 1 receives all of the hot gases from the jet power plant in this class of flight. It is specifically to be mentioned, however, that only that quantity of hot gases is required for utilization in the horizontal jet as is necessary to maintain the aircraft in desired speed of forward motion, though it does appear that the amount of forward motion permissably may be somewhat negligible depending upon wing contour and the amount of air flow which can be generated thereover by utilization of the intermediate jet. There are circumstances, however, where it may be desired to employ a re-direction of thrust from the main or horizontal jet it self such as in reverse thrust braking of forward motion by main jet reversing baffles (not shown). Especially in aircraft of large aspect ratio it is desired that the hot gases be used substantially entirely in the horizontal or main jet though this is not to be construed as a limitation of the contemplated use of the intermediate jet system described herein.

In aircraft of small aspect ratio as for example, fighter aircraft, ordinarily characterized by high landing speed, it may be desired to provide for a forward jet thrust braking effect both from the main or horizontal jet and the intermediate jet of the wing structure. Under such conditions the continuance of the flow of boundary surface air over the wing contours may not be assured and any factor of conventional lift may disappear especially should it be required to effectively suspend the aircraft or to move it rearwardly. Again, under conditions of take-off it may be desirable to raise the aircraft directly vertically without sufficient forward motion to develop an effective element to lift by virtue of air flow over the wing surfaces. These conditions are indicated in FIGURES 5, 8 and 11 wherein the normal aerodynamic lift arrow 28 is contained within a circle 42 to indicate that it is wholly dependent on forward motion and is thus negligible. In addition, arrow 40 is contained within a chain line circle 43 to indicate that this lift factor may or may not be present. Stability is, therefore, achieved by utilizing a lift factor 44 obtained from the downward blast thrust 45 (FIGURE 1) from vertical jet nozzle structure 46 in communication by duct 17 with the manifold 15 and valving 16 causing the hot gases to be directed from the main jet tube forwardly and downwardly to provide a downward blast. Observe that the control of the lower door 22, and rear flap 19, provides a diffuser structure for the intermediate jet directing downward thrust 39 therefrom in a forward direction if desired whereby the direction of motion of the craft under this class of operation is represented by upward arrow groups 47 and the downward arrow groups 48 having a range of direction closely about the vertical. As will be observed in FIGURE 11 valves 13 and 16 direct the cold and hot gases respectively to the intermediate jet and vertical whereby the horizontal jet may develop no forward thrust component. While the invention may not require the utilization of this thrid class of operation, it will be observed that it is smoothly compatible with the intermediate jet concept set forth herein in that in the operation represented by FIGURES 5, 8 and 11 the intermediate jet diffuser may be moved to cause a slight forward component of thrust which at negligible forward speed will develop a positive lifting effect in the location of arrows 28 and 40 while a portion of the hot gases may be smoothly valved into the horizontal jet whereupon the operation of FIGURE 4 may be quickly arrived at without any way upsetting stability since any momentary loss in stability or trim for whatever reason, may be recovered by increased use of the vertical jet or an increased forward motion by an increased use of the horizontal jet. In the latter case operation quickly resolves to that of FIGURE 4 wherein the hot gases are utilized wholly in the horizontal jet. Clearly operation may shift quickly from that of FIGURE 4 to the normal operation of FIGURE 3 of conventional high speed flight at which point the auxiliary air is delivered to the main horizontal jet. The invention, therefore, provides for maintenance of stability during the three classes of flight described and during change from one class of flight to the other in such manned that the control functions to be accomplished are correlated to a degree that they compatibly overlap substantially. Thus the range of operation represented by FIGURE 4 may extend substantially into the range of operation of FIGURE 3 and of FIGURE 5. Again, the classes of operation represented by FIGURES 3 and 5 may extend substantially into the area of directional motion of operation according to FIGURE 4. For convenience operation of FIGURE 3 may be described as Class 1, FIGURE 4, Class 2, FIGURE 5, Class 3, again identifiable as horizontal, intermediate and vertical flight characteristics.

From the foregoing it will be appreciated that the invention embodies in its method aspects the creation of lift substantially independent of forward speed in an airfoil wing section having a rigid portion and a flap defining a trailing edge of the section. A spanwise gap is established between the rigid portion or fore portion of the section and the flap portion and a jet stream is generated within the gap and directed downwardly thus to cause large quantities of air to be inducted into the gap from the upper surface thereby to increase the air flow over the upper surface substantially independent of forward speed. This increased air flow generates a lift component. In addition, the jet stream augmented by the inducted air effectively operates within the gap as a fluid pump for large quantities of air. According to the invention, the augumented jet stream is shrouded by the limits or side walls of the gap and by lower and upper door elements to shroud and diffuse the same into a jet thrust component directable downwardly.

What we claim is:

1. The method of creating lift supplementary to normal airfoil lift at less than cruising speed and comprising: establishing upper and lower airfoil surfaces including rear flap surfaces adapted at the same forward velocity to effect a greater velocity of air over the upper surfaces than over the lower surfaces thereby to create normal airfoil lift at forward cruising speeds; at less than cruising speeds opening the airfoil surfaces forward of said flap surfaces and spanwise to establish a spanwise gap therethrough; projecting gases into said gap and controlling the flow thereof in a direction toward and beyond the lower airfoil surfaces; varying said gas emission and the size of said gap and direction of gases emitting therefrom to control the supplementary lift; and the step of inducting secondary air with said jet stream into said gap by deflectably scooping into said gap air moving past the upper surfaces of said airfoil from regions above the normal airfoil surface contours.

2. An intermediate lift system for aircraft having port and starboard wing elements and adapted at less than cruising speeds to develop a large lift component with said elements and comprising: a rigid portion separated from a trailing edge flap by a spanwise gap and defining an incomplete airfoil section for each of said wing elements; upper and lower door elements closeable over said gap to complete said airfoil section and when opened defining with said flap, upon deflection of the latter, a spanwise shroud and diffuser for the passage of wing surface air into said gap and toward and beyond the lower surface of said section; and means for generating a spanwise jet stream intermediate said gap and entirely within said wing section thus to induct air from said wing surfaces into said shroud for thrust diffusion creating a downward thrust component from said diffuser and by the induction of air over said surfaces increasing the air flow thereover to create a nose-up moment substantially balancing the moment of said downward thrust on said wing elements.

3. The system as claimed in claim 2 in which the aircraft is adapted for flight at cruising and higher speeds without recourse to the intermediate lift system and is adapted for an intermediate class of flight at less than cruising speeds but at an effective forward speed greater than about two pounds per square foot leading edge dynamic pressure, said flap and door elements being deflected to form a vertical blast nozzle located relative to the lift characteristics of said wing element; a main horizontal jet tube for said aircraft; a jet power plant including means for shiftably by-passing gases thereof to said spanwise jet stream and said vertical blast nozzle thereby to provide an intermediate lift system compatibly shiftable to a vertical lift system by direction of power plant gas to said vertical blast nozzle and compatibly shiftable to a conventional airfoil lift system by direction of all gases to said main jet tube.

4. The system claimed in claim 2 in which said upper door for said gap is adapted to define an airfoil contour merging with the remaining upper surface contour of said airfoil section when positioned to close said gap.

5. The system claimed in claim 2 and means defining a leading edge for said upper door adapted to be moved to a position exterior of the contour of said wing section upon opening of said door and adapted to scoop substantial quanities of air into said gap during forward motion of said wing section.

References Cited by the Examiner
UNITED STATES PATENTS

| | | | |
|---|---|---|---|
| 2,466,466 | 4/1949 | Morrison | 244—42. |
| 2,885,162 | 5/1959 | Griswold | 244—42. |
| 2,912,189 | 11/1959 | Pouit | 244—42 X |
| 3,045,947 | 7/1962 | Bertin et al. | 244—42 X |
| 3,075,725 | 1/1963 | Dornier | 244—42 X |
| 3,085,740 | 4/1963 | Wagner | 244—42 X |
| 3,092,354 | 6/1963 | Alvarez-Calderon | 244—42 X |

FOREIGN PATENTS

| | | |
|---|---|---|
| 167,541 | 4/1956 | Australia. |

MILTON BUCHLER, *Primary Examiner.*

B. BELKIN, *Assistant Examiner.*